United States Patent [19]
Ishizaka et al.

[11] Patent Number: 5,832,261
[45] Date of Patent: Nov. 3, 1998

[54] BARRIER SYNCHRONIZING MECHANISM FOR A PARALLEL DATA PROCESSING CONTROL SYSTEM

[75] Inventors: Kenichi Ishizaka; Masayuki Katori; Masayuki Ikeda; Shigeru Nagasawa; Hiroshi Komatsuda, all of Kawasaki, Japan

[73] Assignee: Fujitsu Limited, Kawasaki, Japan

[21] Appl. No.: 983,075

[22] Filed: Nov. 30, 1992

[30] Foreign Application Priority Data

Nov. 28, 1991 [JP] Japan ............................ 3-314164

[51] Int. Cl.$^6$ ............................................ G06F 15/16
[52] U.S. Cl. ................ 395/670; 395/800.01; 395/672
[58] Field of Search ..................... 395/800, 650, 395/375, 670, 672, 674, 800.01; 364/281.3, 230.3, DIG. 1; 340/825.8

[56] References Cited

U.S. PATENT DOCUMENTS

| | | | |
|---|---|---|---|
| 4,412,285 | 10/1983 | Neches et al. | 364/DIG. 1 |
| 4,829,422 | 5/1989 | Morton et al. | 364/DIG. 1 |
| 4,914,583 | 4/1990 | Weisshaar et al. | 364/DIG. 1 |
| 5,047,925 | 9/1991 | Kun et al. | 364/DIG. 1 |
| 5,127,092 | 6/1992 | Gupta et al. | 395/375 |
| 5,202,987 | 4/1993 | Bayer et al. | 395/650 |
| 5,365,228 | 11/1994 | Childs et al. | 340/825.8 |

FOREIGN PATENT DOCUMENTS

| | | |
|---|---|---|
| 0475282 | 3/1992 | European Pat. Off. . |
| 0602906 | 6/1994 | European Pat. Off. . |
| 52-11740 | 1/1977 | Japan . |
| 52-22406 | 2/1977 | Japan . |
| 8807724 | 10/1988 | WIPO . |
| WO 88/07724 | 10/1988 | WIPO . |

OTHER PUBLICATIONS

Jeng and Siegel, "A Distributed Management Scheme for Partitionable Parallel Computers", *IEEE Transactions on Parallel & Distributed Systems*, Jan. 1990, pp. 120–126.

Lakshmi and Yu, "Effectiveness of Parallel Joins", *IEEE Transactions on Knowledge & Data Engineering*, Dec. 1990, pp. 410–424.

IBM Technical Disclosure Bulletin, vol. 31, No. 11, Apr. 1989; "Low–Cost Device for Contention–Free Barrier Synchronization," pp. 382–389.

Beckmann et al., "Fast Barrier Synchronization Hardware", *Supercomputing '90*, 1990, pp. 180–189.

*Primary Examiner*—Alyssa H. Bowler
*Assistant Examiner*—Walter D. Davis, Jr.
*Attorney, Agent, or Firm*—Staas & Halsey

[57] ABSTRACT

In a parallel data processing control system for a parallel computer system having a plurality of computers and an adapter device connecting the computers to each other, a first unit, which is provided in the adapter device, transfers pieces of data processing progress state information to the computers. The pieces of the data processing progress state information respectively indicate data processing progress states of the computers. A second unit, which is provided in each of the computers, holds the pieces of the data processing progress state information. A third unit, which is provided in each of the computers, holds management information indicating a group of computers which share a data process. A fourth unit, which is provided in each of the computers, determines whether or not the computers in the group have completed the data process on the basis of the pieces of the data processing progress state information and the management information.

5 Claims, 18 Drawing Sheets

F I G. 8A
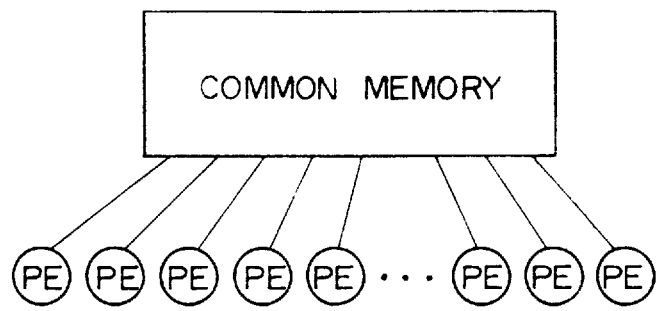
F I G. 8B
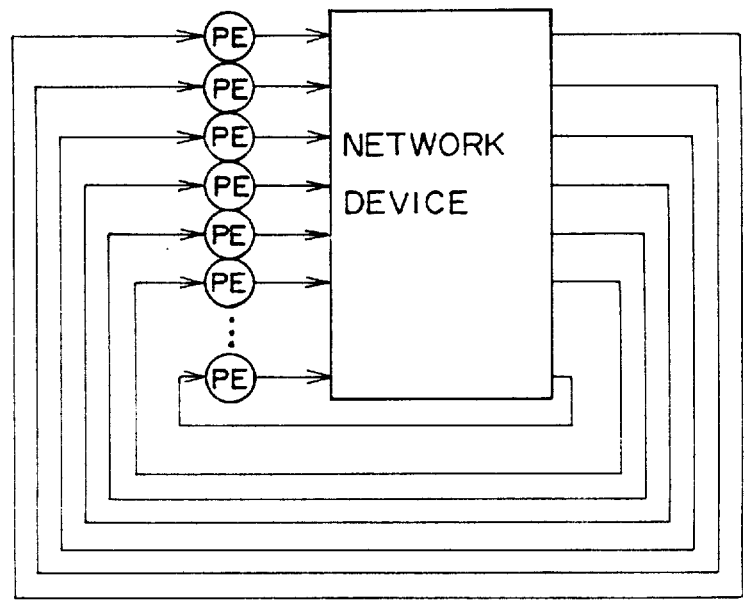

FIG.13

| BIT NUMBER → | 0~9 | 10~19 | 20~29 | ... | 80~89 | 90~99 |
|---|---|---|---|---|---|---|
| | 1~1 | PARITY 0 | PE 0 ~ PE 7 PARITY 0 | ... | PE 48 ~ PE 55 PARITY 0 | PE 56 ~ PE 63 PARITY 0 |

1 · #2 · #3

| ... | BARRIER DATA (ID=1) | BARRIER DATA (ID=2) | ....... | BARRIER DATA (ID=n) | BARRIER DATA (ID=1) | .. |

BARRIER SYNCHRONIZING MECHANISM FOR A PARALLEL DATA PROCESSING CONTROL SYSTEM

BACKGROUND OF THE INVENTION

1. Field of the Invention

The present invention generally relates to a parallel data processing control system which generates a synchronizing signal and sends it to computers which execute identical parallel data processing processes.

2. Description of the Related Art

In a parallel computer system, a plurality of computers share a program and execute a parallel operation on the shared program. When the execution of the shared program is completed, a next program is shared and operations thereof are executed by the computers. In the above case, it is impossible to predict the time when the shared program will be completed. Hence, a barrier synchronizing mechanism as shown in FIG. 1 is used. When the barrier synchronizing mechanism, shown in FIG. 1 is informed by all the computers PE1—PEn (n is an integer) that the execution of a program has been completed, it broadcasts a barrier synchronizing signal for input of the next program to all the computers.

It will now be assumed that four computers PE1–PE4 are connected to the barrier synchronizing mechanism, as shown in FIG. 2. When the computers PE1–PE4 have completed respective processes A1–A4 of a program, the barrier synchronizing mechanism generates the barrier synchronizing signal. Then, the computers PE1–PE4 start to execute respective processes B1–B4 of the next program. When the computers PE1–PE4 have completed the processes B1–B4, they start to execute respective subsequent program processes C1–C4 in response to the barrier synchronizing signal. It is required that the barrier synchronizing mechanism have a simple configuration in order to avoid an increase in the complexity in the hardware structure of the parallel computer system.

Generally, the barrier synchronizing mechanism generates the barrier synchronizing signal where a plurality of program groups are concurrently executed or where a plurality of processes, which are allowed to be divided, exist in one program and are concurrently executed. Referring to FIG. 3, the computers PE1–PE3 concurrently execute respective processes D1–D3 of a program D, and the computers PE4 and PE5 concurrently execute respective processes G1 and G2 of another program G. The computers PE1–PE3 start to execute respective processes E1–E3 of the next program E when the execution of the program D has been completed, and start to execute respective processes F1–F3 of the next program F when the execution of the program E has been completed. The computers PE4 and PE5 start to execute respective processes H1 and H2 of a program when the execution of the program G has been completed. Hence, the barrier synchronizing mechanism generates the barrier synchronizing signal each time the execution of each of the programs D, E, F G and H is completed. Hereinafter, the term "barrier groups" indicates programs that are concurrently executed.

FIG. 4 shows a barrier synchronizing mechanism capable of generating the barrier synchronizing signal in the above-mentioned manner. A parallel computer system shown in FIG. 4 includes computers 1—1 (PE1)—1—n (PEn), and a barrier synchronizing mechanism 2. The barrier synchronizing mechanism 2 includes a PE status register 3, k mask registers 4—1—4—k (k is an integer), k barrier synchronizing signal generators 5—1—5—k, and n selectors 6—1—6—n. The PE status register 3 is used to manage pieces of program process completion information supplied from the computers 1—1—1—n. The variable k corresponds to the number of barrier groups concurrently executable. The mask registers 4—1—4—n are used to manage information indicating the names of the computers sharing each of the programs of the barrier group. The barrier synchronizing signal generators 5—1—5—n generate respective barrier synchronizing signals from the data managed by the PE status register 3 and the data managed by the mask registers 4—1—4—n. Each of the selectors 6—1—6—n, which are respectively provided for the computers 1—1—1—n, selects a corresponding one of the barrier synchronizing signal generators 5—1—5—k on the basis of the management data registered in the mask registers 4—1—4—k, and sends the barrier synchronizing signal from the selected generator to the corresponding computer.

When computer 1—i (i=1—n) has not informed the barrier synchronizing mechanism 2 of the completion of the program, data "0" is registered in an entry area of the PE status register 3 corresponding to the computer 1—i. When the mechanism 2 has been informed of the completion of the program, a "1" is registered in the corresponding entry area of the PE status register 3 in lieu of a "0". In this manner, the mechanism 3 manages the pieces of the program process completion information from the computers 1—1—1—n.

The mask registers 4—1—4—k manage information indicating the names of the computers. As shown in FIG. 5, a "1" is registered into each entry area related to each computer that executes a program of a barrier group, and a "0" is registered into each entry area related to each computer that does not execute the program of the barrier group.

Each of the barrier synchronizing signal generators 5—1—5—k refer to the management data registered in the PE status register 3, and determines whether or not all the computers indicated as computers that share the program have completed the operation. When the barrier synchronizing mechanism 2 confirms that all the computers have completed the operation, the barrier synchronizing signal generated by the corresponding generator 5—i is applied to the selectors 6—1—6—n. Then, the selectors related to the computers that deal with the above program pass through the barrier signal in accordance with the management information registered in the mask registers 4—1—4—k.

However, the barrier synchronizing mechanism 2 as described above has the following disadvantages. It is necessary to provide a plurality of mask registers 4—1—4—k corresponding to number to the barrier groups concurrently executable. Further, it is necessary for each of the mask registers 4—1—4—k to have a storage capacity (bit length) equal to the number of computers 1—1—1—n. Furthermore, it is necessary to provide a plurality of selectors 6—1—6—n equal in number to the computers 1—1—1—n. Hence, the barrier synchronizing mechanism 2 needs a large quantity of hardware. This becomes important as the number of barrier groups increases. Particularly, it is very difficult to control the sequence of generating the barrier synchronizing signals in a case where a combination of barrier groups is requested.

SUMMARY OF THE INVENTION

It is the object of the present invention is to provide a parallel data processing control system capable of generating barrier synchronizing signals using minimal hardware.

The above object of the present invention is achieved in a parallel data processing control system for a parallel computer system having a plurality of computers, and an adapter device connecting the computers to each other. Wherein, the adapter device is adapted for transferring pieces of data processing progress state information to the computers, the pieces of the data processing progress state information respectively indicating data processing progress states of the computers. The computers are further adapted for holding the pieces of the data processing progress state information and for holding management information indicating a group of computers which share a data process. The computers are also adapted for determining whether or not the computers in the group have completed the data process on the basis of the pieces of the data processing progress state information and the management information.

BRIEF DESCRIPTION OF THE DRAWINGS

Other objects, features and advantages of the present invention will become more apparent from the following detailed description when read in conjunction with the accompanying drawings, in which:

FIG. 8A is a block diagram of a first configuration of a parallel computer system;

FIG. 8B is a block diagram of a second configuration of a parallel computer system;

FIG. 13 is a diagram showing a data format of serial data;

DESCRIPTION OF THE PREFERRED EMBODIMENTS

Figure 1:
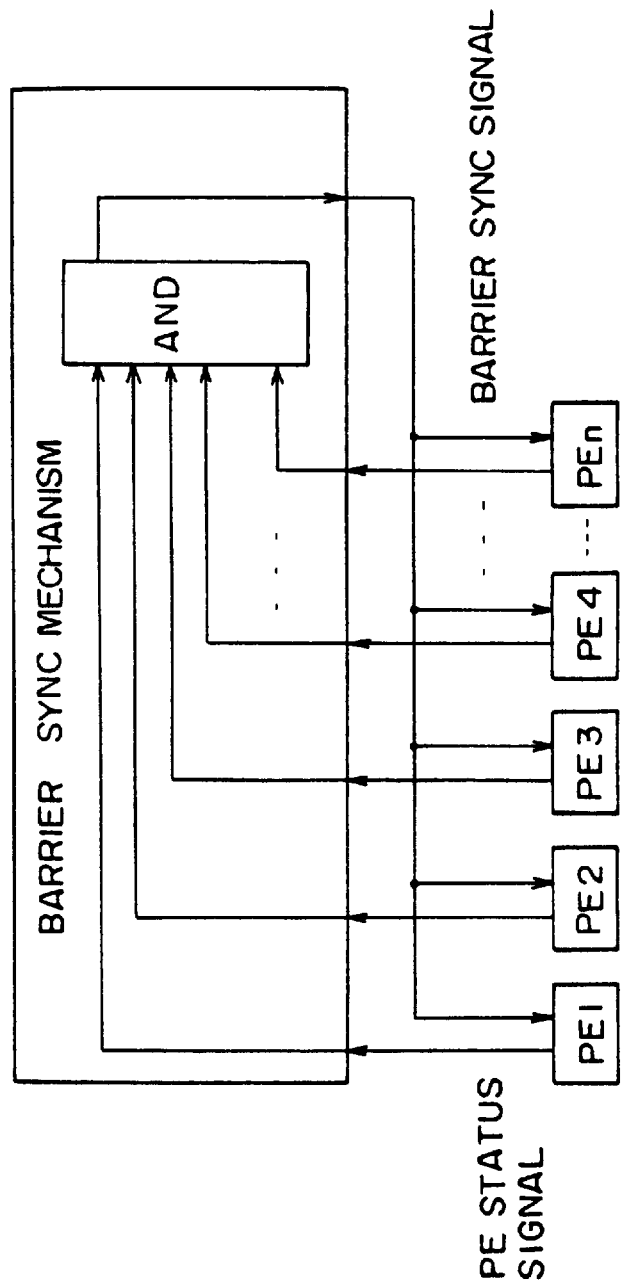
FIG. 1 is a block diagram of a barrier synchronizing mechanism related to the present invention.
Figure 2:
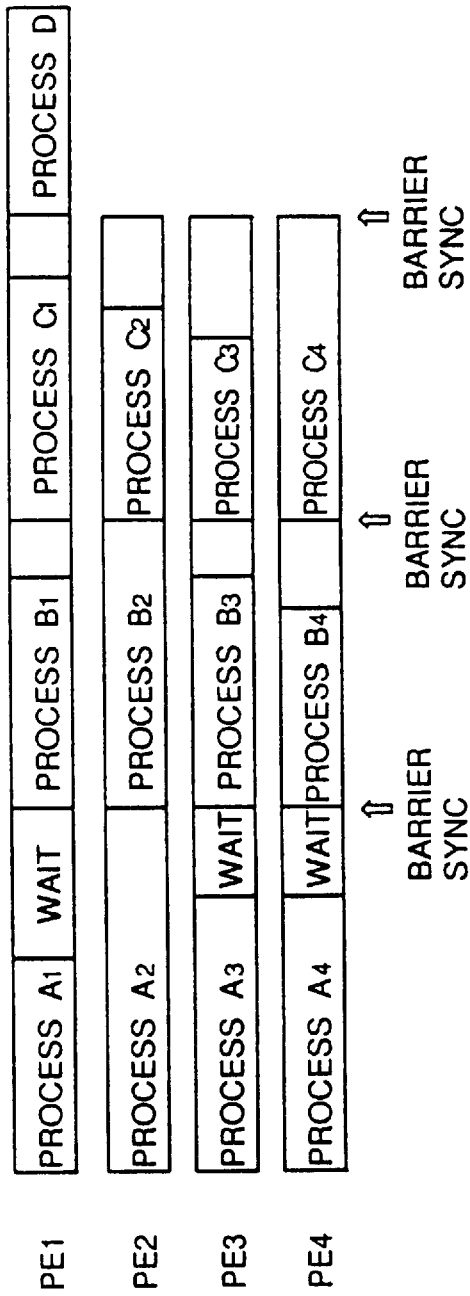
FIGS. 2 and 3 are timing charts showing the operations of the barrier synchronizing mechanism shown in FIG. 1.
Figure 3:
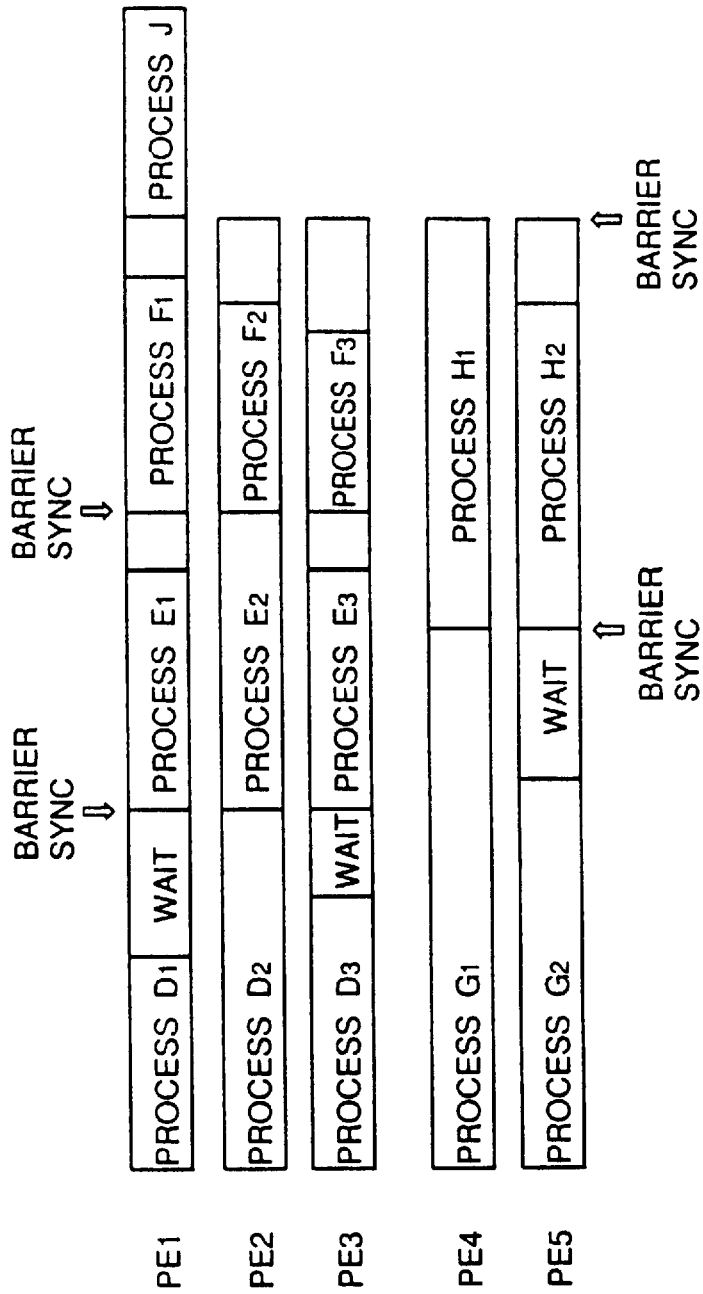
Figure 4:
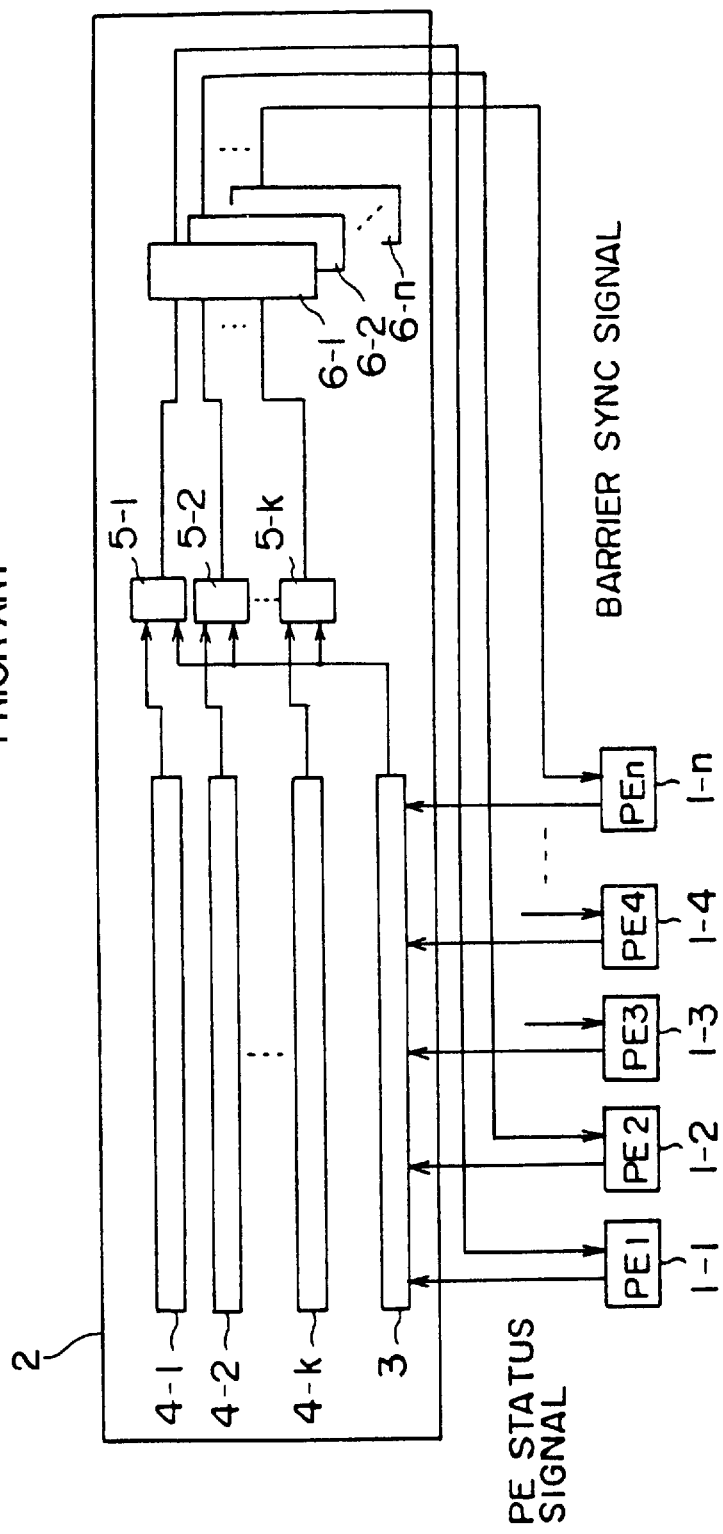
FIG. 4 is a block diagram showing the details of the barrier synchronizing mechanism shown in FIG. 1.
Figure 5:
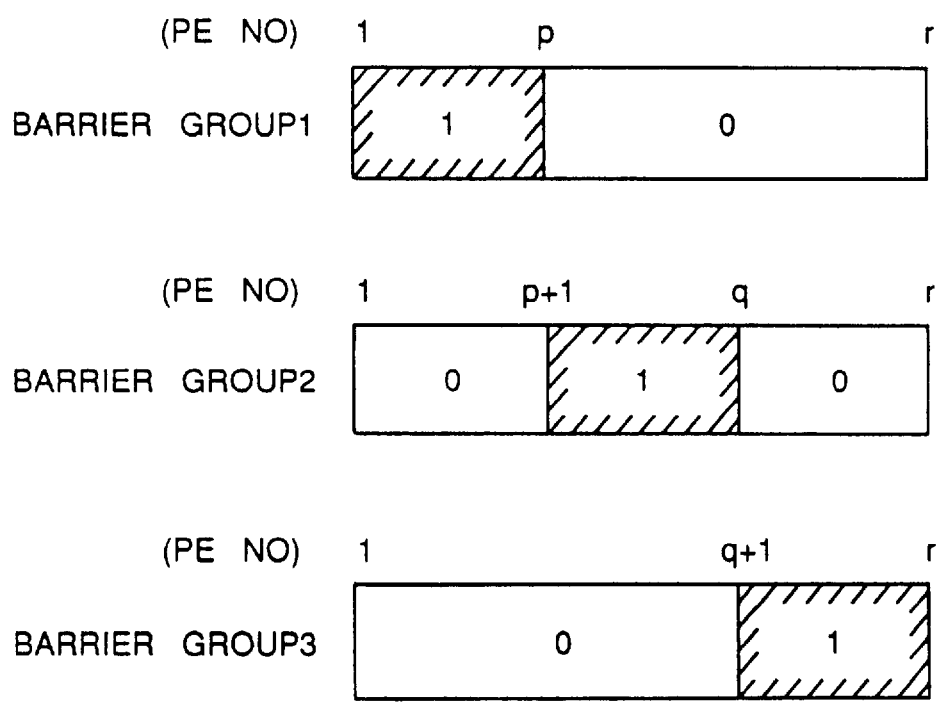
FIG. 5 is a diagram showing management data registered in mask registers shown in FIG. 1.

A description will now be given of an overview of a system in accordance with the present invention with reference to FIGS. 6 and 7. A parallel computer system is made up of a plurality of computers 10—1—10—n. An interconnection device (also referred to as an adapter device) 20 connects the computers 10—1—10—n to each other via serial transmission lines 30.

The adapter device 20 comprises a status register 21, and transmission units 22. The status register 21 registers pieces of data processing progress state information concerning the respective computers 10—1—10—n. The data processing progress state information concerning each of the computers indicates whether or not the execution of a program has been completed. The transmission units 22, which are respectively provided for the computers 10—1—10—n, serially transfer the pieces of the data processing progress state information to the computers 10—1—10—n via this serial transmission lines 30. In the configuration, two serial transmission lines 30 connect the adapter device 20 to each of the computers 10—1—10—n. The progress state information registered in the status register 21 begins, via the two serial transmission lines 30, at different transfer starting timings. It is also possible to use either a single serial transmission line or more than two serial transmission lines.

The computer 10—1 comprises receiving units 11, respectively provided for the two serial transmission lines 30, a holding unit 12, a management unit 13, and a check unit 14. The holding unit 12 receives pieces of the progress state information, and converts them into parallel data. The management unit 13 provided in the computer 10—1 manages the name of the computer 10—1 and the names of other computers that share the parallel data process (program) together with the computer 10—1. The check unit 14 checks the status of data processing progress of the parallel computer system on the basis of the data managed by the holding unit 12 and the management unit 13. Each of the other computer systems 10—2—10—n is configured in the same manner as the computer 10—1.

The transmission units 22 of the adapter device 20 repeatedly transfer the progress state information registered in the status register 21 to the computers 10—1—10—n, via the serial transmission lines 30, in a serial manner. The receiving units 11, provided in each of the computers 10—1—10—n, stores the pieces of the progress state information, sequentially transferred and received via the serial transmission lines 30, so that the progress state information registered in the holding unit 12 is the same as the progress state information registered in the status register 21. In the case where two or more serial transmission lines 30 are used, the corresponding receiving units 11 successively receive the pieces of the progress state information at different timings, and hence the pieces of the progress state information can be written into the holding unit 13. During the above operation, the check unit 14 refers to the progress state information held in the holding unit 12, and determines whether or not all computers indicated as sharing a program have completed the program. When the check unit 14 confirms that all the computers have completed the program, it generates a synchronizing signal.

Figure 7:
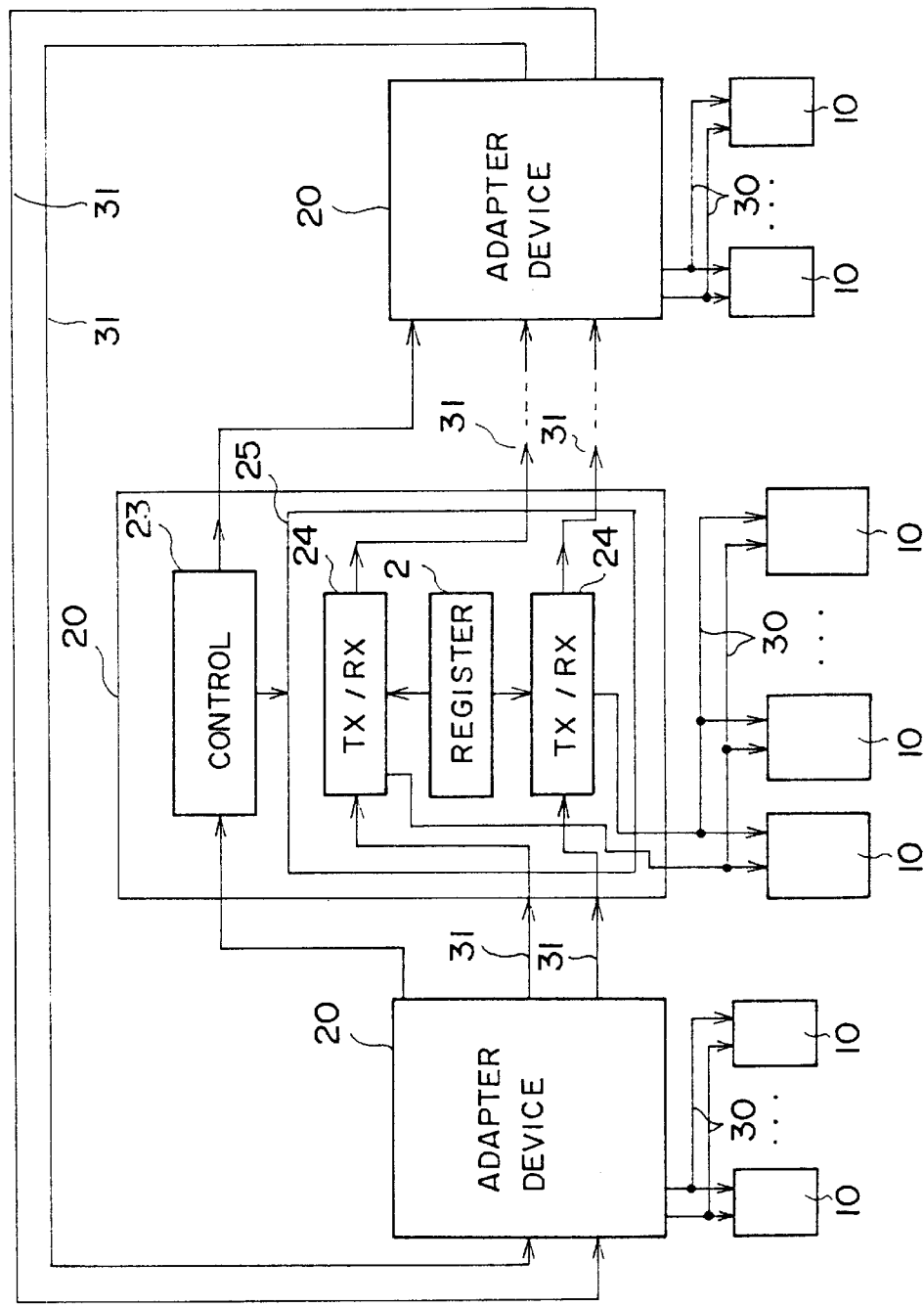
FIG. 7 is a block diagram of an overview of a second configuration of the present invention.

FIG. 7 shows an overview of a system in accordance with the present invention in which a plurality of adapter devices 20 are used. A plurality of computers 10 are connected to each of the adapter devices 20. For the sake of convenience, all the computers shown in FIG. 7 are indicated by the reference number "10". Adjacent adapter devices 20 are connected to each other via serial transmission lines 31. The serial transmission lines 30 are provided for each of the adapters 20 so that the serial transmission lines 30 are equal in number to the serial transmission lines 31.

Each of the adapter devices 20 comprises a control unit 23 and a transmitter/receiver unit 25. The transmitter/receiver unit 25 is made up of two transmitter/receiver blocks (TX/RX) 24 respectively connected to the serial transmission lines 31, and a status register 21 connected to the two blocks 24. The register 21 shown in FIG. 7 corresponds to the status register 21 shown in FIG. 6. The control unit 23 receives a command issued by one of the adjacent adapter devices 20 (hereinafter also referred to as a first adjacent adapter device), and transfers this command to an other one of the devices 20 (hereinafter also referred to as a second adjacent adapter device). The command issued by the first adjacent adapter device 20 indicates transfer of progress state information registered in the status register 21 of the adapter device 20 (located between the first and second adjacent adapter devices). When the transfer of progress state information indicated by the first adjacent adapter device 20 has been completed, the control unit 23 sends the second adjacent adapter device 20 a command which indicates transfer of progress state information is registered in the status register 21 of the adapter device 20 between the first and second adjacent adapter devices 20.

When the above-mentioned command is held in the control unit 23, each of the transmitter/receiver blocks 24 transfers, via their respective serial transmission lines 30 at the respective transmission timings, the progress state information registered in the status register 21 of the adapter device being considered as well as transferring identification information indicative thereof to the computers 10 under the control of the adapter device being considered. Further, each of the transmitter/receiver blocks 24 transfers, via the respective serial transmission lines at the respective transmission timings, the progress state information registered in the status register 21 of the adapter being considered, as well as transferring the identification information indicative thereof to the second adjacent adapter device 20.

When the above-mentioned command is not held in the control unit 23, each of the transmitter/receiver blocks 24 receives, via the respective transmission lines 31, the progress state information registered in the status register 21 of the first adjacent adapter device 20 as well as the identification information indicative of the first device 20, and serially transfers, via the respective serial transmission lines 30, the received progress state information to the computers 10 under the control of the adapter device being considered. Further, each of the transmitter/receiver blocks 24 transfers, via the respective transmission lines 31 at the respective transmission timings, the received information to the second adapter device 20.

In a case where the interconnection between adjacent adapter devices 20 is fixed, and the adapter devices 20 respectively transfer information in a given transmission sequence, each of the transmitter/receiver blocks 24 is capable of identifying, without transferring the terminal adapter identification information, from which adapter device the received information is sent. In this case, it is possible to omit transfer of the adapter device identification information.

Each of the computers 10 shown in FIG. 7 comprises a receiving unit 11, a holding unit 12, a management unit 13 and a check unit 14. The holding unit 12 can hold the pieces of the progress state information stored in, not only the status register 21 of the adapter device 20 to which each of the computers 10 is directly connected but also, the status registers 21 of the other adapter devices 20. The receiving units 11 write the pieces of the progress state information transferred via the serial transmission lines 30 in accordance with the identification information also transferred via the serial transmission lines 30. The management unit 13 manages all the computers connected to the adapter units 20.

The transmitter/receiver blocks 24 of the adapter device 20 in which the command is held, for indicating transfer of the progress state information latched in its status register 21, serially transfer, at the respective timings, the pieces of the progress state information registered in the status register 21 and the identification information of the adapter device 20 having the command to the computers 10 under control of the adjacent adapter device 20. This adjacent adapter device 20 serially transfers the received pieces of the progress state information and the received identification information to the computers 10, and transfers these pieces to the adjacent adapter device 20. The control unit 23 of the adapter device 20, in which the command is held, is transferred to the adjacent adapter device 20 after transfer of data is completed. The above operation is repeatedly carried out, so that the holding unit 12 of each of the computers 10 holds data identical to that in the status registers 21 of all the adapter devices 20. In the case where a plurality of serial transmission lines 31 are provided, the transmitter/receiver blocks 24 send data to the respective serial transmission lines at different transmission timings.

The check unit 14 refers to the data held in the holding unit 12, and determines whether or not all computers indicated as computers sharing a program have completed the shared program. When the above completion is confirmed, the synchronizing signal is generated.

According to the present invention, the selectors 6—i can be omitted, and the amount of hardware in the structure corresponding to the barrier synchronizing mechanism 2 can be considerably reduced. The function of the management unit 13 corresponding to the mask registers 4—i is shared by the computers 10—i. The adapter devices thus do not need a large amount of hardware. In addition, it is easy to cope with change of the program groups.

A description will now be given of an alternative embodiment of the present invention. It will be noted that there are two types of parallel computer systems. As shown in FIG. 8A, a parallel computer system may have a common memory in order to transfer data between computers PE, each of which computers accesses the common memory or as shown in FIG. 8B, a parallel computer system may have a network device that controls the interconnections between computers. The adapter device 20 shown in FIG. 6 or 7 can be applied to the common memory shown in FIG. 8A and to the network device shown in FIG. 8B. The embodiment of the present invention described below is related to the parallel computer system shown in FIG. 8B. In the following description, the computers are indicated by the reference number "10", and the network device is indicated by the reference number "40".

Figure 9A:
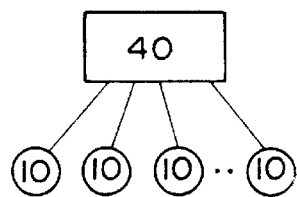
FIGS. 9A, 9B and 9C are block diagrams of three system configurations of the present invention.
Figure 9B:
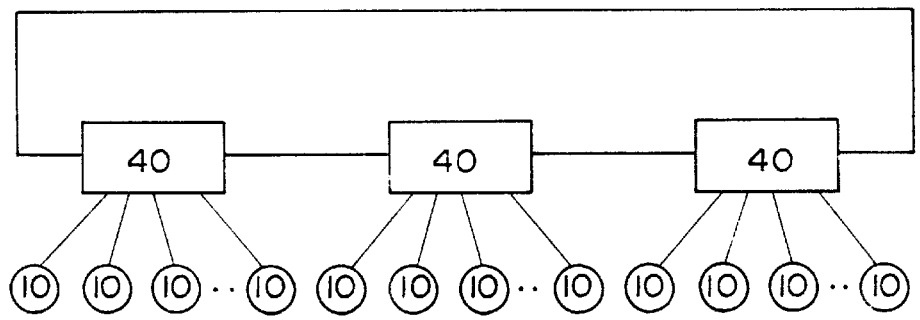
Figure 9C:
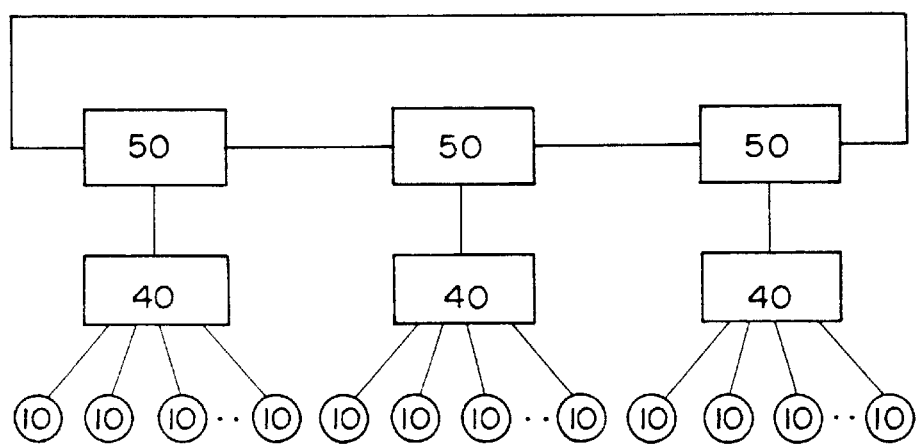
Figure 10:
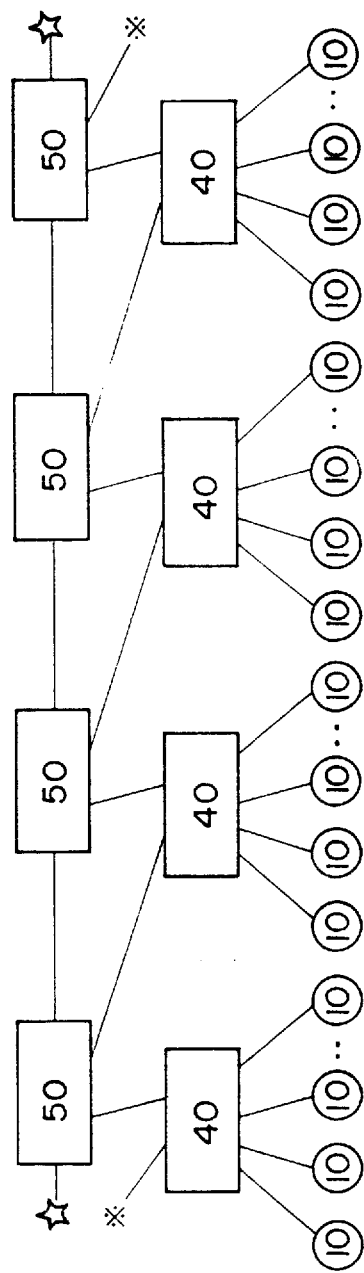
FIG. 10 is a block diagram of a parallel computer system.

As shown in FIG. 9A, it is possible to realize barrier synchronizing control by a single network device 40 when a small number of computers 10 are used. As shown in FIG. 9B, a plurality of network devices 40 connected to each other in loop form can be used to realize barrier synchronizing control when a large number of computers 10 are used. As shown in FIG. 9C, it is also possible to realize barrier synchronizing control by providing upper network devices 50 respectively controlling the network devices 40 and connecting the upper network devices 50 to each other so that a loop circuit is formed. The embodiment of the present invention which will be described below is concerned with the configuration shown in FIG. 9C. However, in practice, a connection structure as shown in FIG. 10 is employed in order to construct a cross-bar network.

Figure 11:
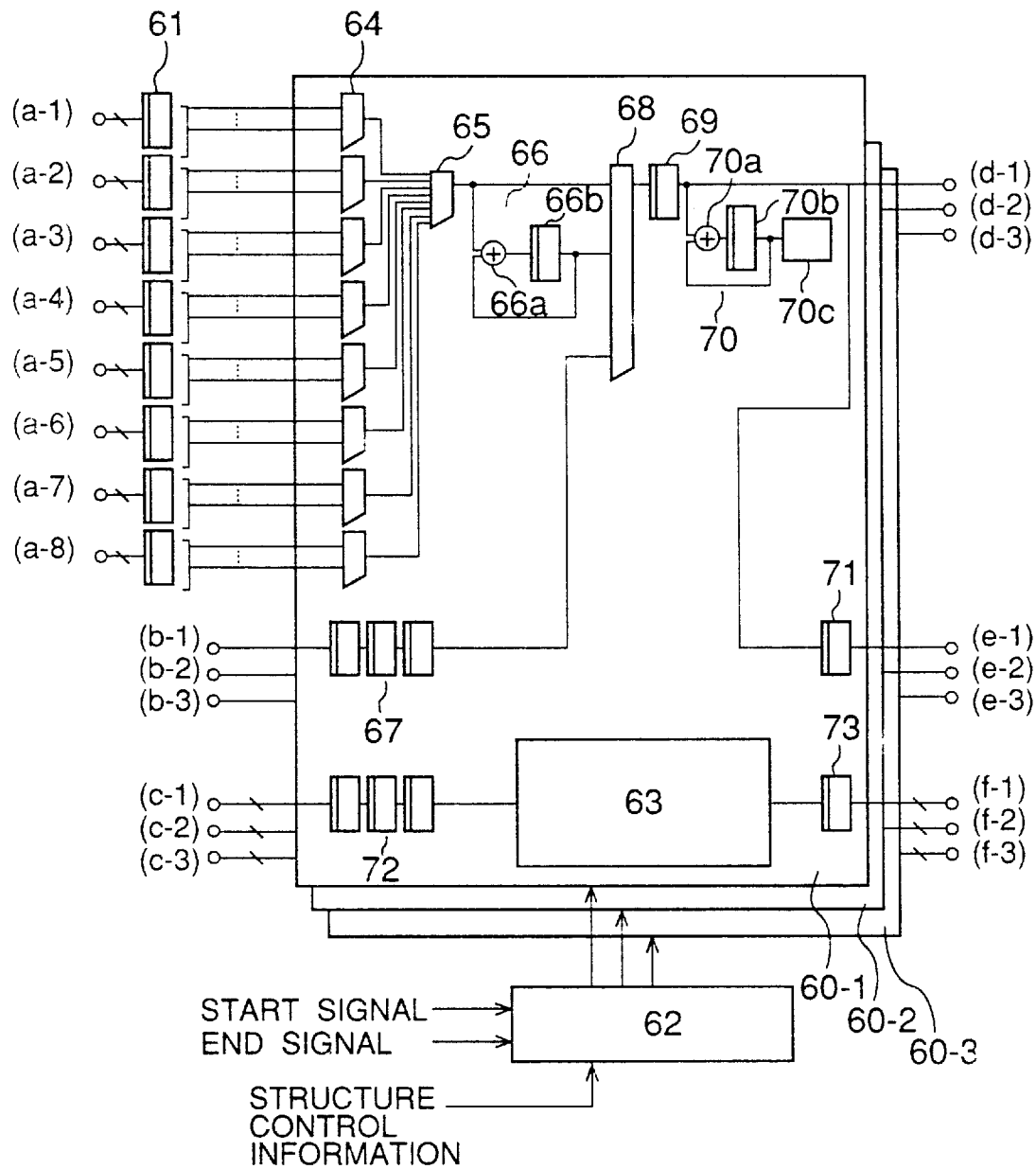
FIG. 11 is a block diagram of a network device realizing barrier synchronizing control according to the present invention.
Figure 12:
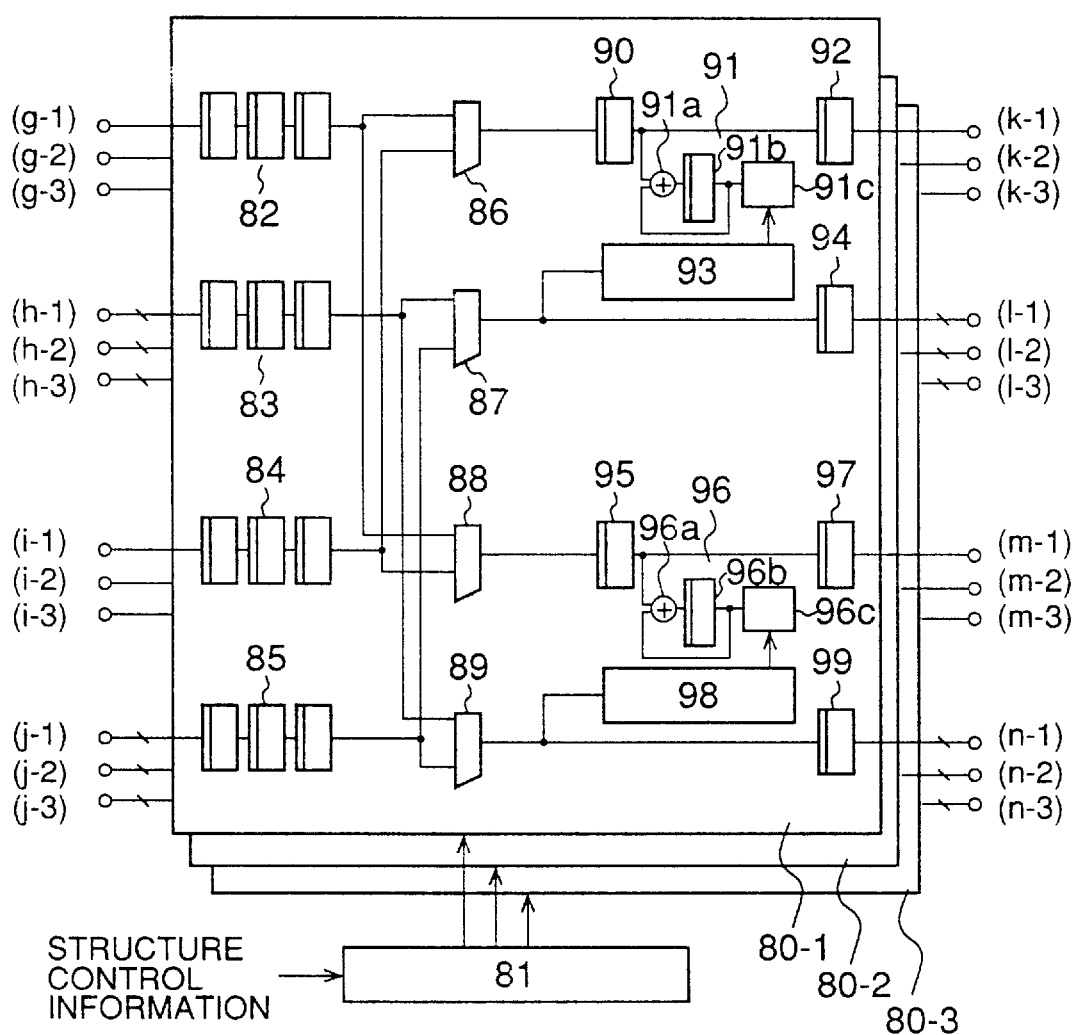
FIG. 12 is a block diagram of an upper network device realizing barrier synchronizing control according to the present invention.
Figure 14A:
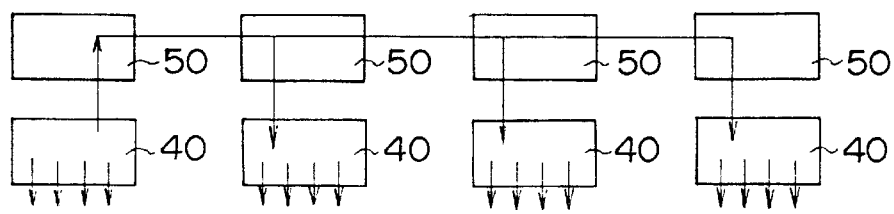
FIGS. 14A through 14D are block diagrams showing the process of the present invention.
Figure 14B:
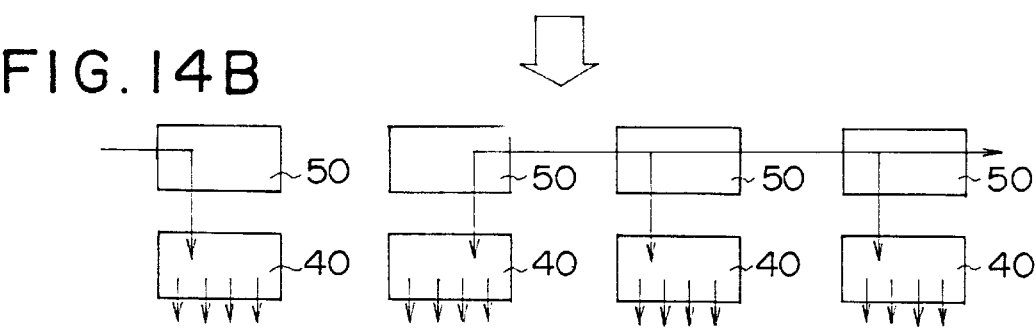
Figure 14C:
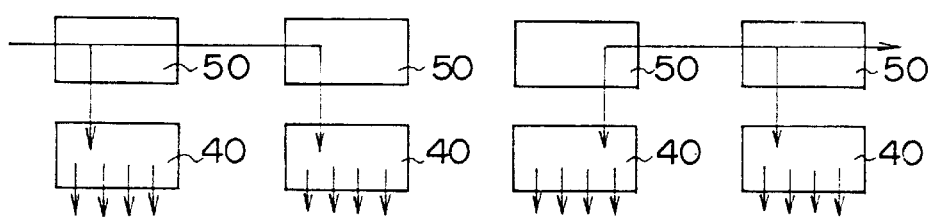
Figure 14D:
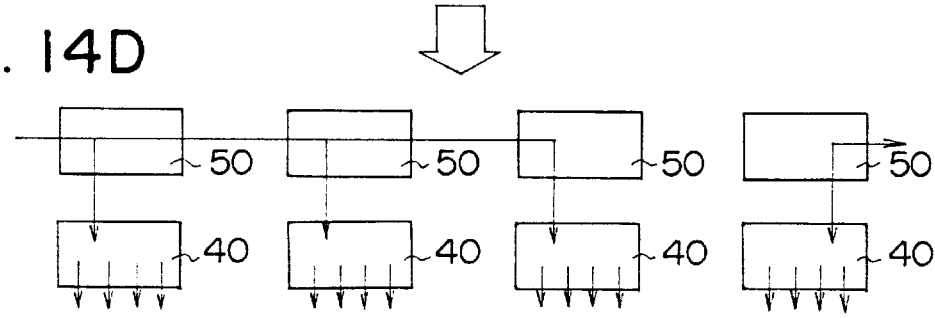

FIG. 11 is a block diagram of the structure of each of the network devices 40 used in the configuration shown in FIG. 9C. FIG. 12 is a block diagram of the structure of each of the upper network devices 50 used in the configuration shown in FIG. 9C.

In the embodiment of the present invention for use in a network as shown in FIG. 9C, three serial transmission lines 30 and three serial transmission lines 31 are used. That is, each of the computers 10 and the corresponding network device 40 are connected to each other via the three serial transmission lines 30, and two adjacent upper network devices 50 are connected to each other via the three serial transmission lines 31. Further, the system according to the present embodiment uses 64 computers 10 connected to each of the network devices 40. As will be described in detail later, a three-bit data line, used to transfer control signals, is provided between each of the network devices 40 and each of the upper network devices 50.

Referring to FIG. 11, the network device 40 for use in the present embodiment comprises three barrier synchronizing control circuits 60—i (i=1, 2, 3) respectively provided for the three serial transmission lines 30 and the three serial transmission lines 31. Each of the barrier synchronizing control circuits 60-i sends program process completion information to each of the 64 computers 10. The program process completion information is used to generate a barrier synchronizing signal. A PE status register 61 includes eight separate register parts, and latches the pieces of the program process completion information sent from the 64 computers 10. The latched pieces of the program process completion information are sent to the barrier synchronizing control circuits 60—i. A barrier controller 62 controls the three barrier synchronizing control circuits 60—i in accordance with a barrier synchronizing control starting signal supplied from a service processor (not shown), a barrier synchronizing control end signal, and structure control information concerning the structure of the parallel computer system. The structure control information includes information indicative of the number of computers.

The pieces of the program process completion information sent from the zeroth through seventh computers 10 are transferred via eight data lines and applied to line ends (a—1) connected to the PE status register 61. Similarly, the pieces of the program process completion information sent from the eighth to 15th computers 10 are transferred via eight data lines and applied to line ends (a—2) connected to the PE status register 61. Each subsequent line end, (a—3)—(a—8), receives pieces of the program process completion information from eight more computer via eight data lines. Thus, line end (a—8) receives from the 56th to 63rd computers 10;

Line ends (b—1) through (b—3) receives data serially transferred from the upper network device 50 connected to the network device 40, as shown in FIG. 11 addressed to the first through the third barrier synchronizing control circuits 61—1 to 61—3 respectively.

Line ends (c—1) through (c—3) receive a control signal transferred from the upper network device 50 connected to the network device 40, as shown in FIG. 11, to the first through third barrier synchronizing control circuits 60—1 through 60—3 respectively, via three data lines.

Data is serially transferred from the first through third barrier synchronizing control circuits 60—1 through 60—3 to the 64 computers 10 under the network device 40 being considered via line ends (d—1) thorugh (3—3).

Data is serially transferred from the first through third barrier synchronizing control circuits 60—1 through 60—3 to the upper network device 50 connected to the network device 40 being considered via line ends (e—1) through (e—3).

Control signals are transferred from the first through third barrier synchronizing control circuits 60—1 through to the upper network device 50 connected to the network device being considered via line ends (f—1) through (f—3), each having three lines.

When the network device 40 is applied to the configuration shown in FIG. 9B, the line ends (b—i) and (c—i) are connected to the network device 40 on the left side of the network being considered, and the line ends (e—i) and (f—i) are connected to the network device 40 on the right side of the network being considered.

A description will now be given of the functions of the barrier synchronizing control circuit 60—1. Each of the other barrier synchronizing control circuits 60—2 and 60—3 has the same functions as the barrier synchronizing control circuit 60—1.

Referring to FIG. 11, a controller 63 controls the entire operation of the barrier synchronizing control circuit 60—1. Eight selectors 64 are respectively connected to the eight PE status registers 61. Each of the eighth selectors 64 receives 8-bit latched data and selects one bit from among the eight bits. A selector 65, which is connected to the eight selectors 64, selects one of the eight one-bit signals from the selectors 64. A parity bit generating circuit 66 is made up of an EOR circuit 66a and a register 66b, and generates parity bits to be added to each eight-bit serial data passing through the selector 65. Three resistors 67 successively latch serial data transferred via the line end (b—1). It is possible to use only one register 67.

A selector 68 receives the output signal of the selector 65, the output signal of the parity bit generating circuit 66, and the output signal of the register 67, and selects one of the three signals. A register 69 sequentially latches the serial data output from the selector 68, and outputs it to the line end (d—1). A check circuit 70 comprising an EOR circuit 70a, a register 70b and a check circuit 70c, carries out a parity check operation on the serial data output from the register 69. A register 71 sequentially latches the serial data output from the register 69, and outputs it to the line end (e—1). A register 72 latches the control signal from the line ends (c—1) and outputs it to the controller 63. A register 73 latches the control signal output from the controller 63, and outputs it to the line ends (f—1).

A description will now be given, with reference to FIG. 12, of the structure of the upper network device 50. The upper network device 50 comprises barrier synchronizing control circuits 80—i (i=1, 2, 3) respectively provided for the three serial transmission lines 30 and the three serial transmission lines 31. Each of the barrier synchronizing control circuits 80—i supplies, via the network device 40, each of the computers 10 with the program process completion signal necessary for generating the barrier synchronizing signal. A barrier controller 81 controls the three barrier synchronizing control circuits 80—i in accordance with the structure control information supplied from the service processor (not shown).

Data is serially transferred from the upper network device 50 adjacent to the left side of the upper network device 50, as shown in FIG. 12, being considered to the first through third barrier synchronizing control circuits 80—1 through 80—3 via data line having lines ends (g—1) through (g—3), respectively.

Control signals are transferred from the upper network device 50 adjacent to the left side of the upper network device 50, as shown in FIG. 12, to the first through third barrier synchronizing control circuits 80—1 through 80—3 via three data lines having line ends (h—1) through (h—3), respectively.

Data is serially transferred from the network device 40 connected to the upper network device 50, as shown in FIG. 12, to the first through third barrier synchronizing control circuit 80—1 through 80—3 via data lines having line ends (i—1) thorugh (i—3), respectively.

Control signals are transferred from the network device 40 connected to the upper network device 50, as shown in FIG. 12, to the first, through third barrier synchronizing control circuit 80—1 through 80—3 via line ends (j—1) through (j—3), each representing three lines.

Data is serially transferred from the first through third barrier synchronizing control circuits 80—1 through 80—3 to the upper network device 50 located on the right hand side of the upper network device 50, as shown in FIG. 12 via line ends (k—1) through (k—3).

Control signals are transferred from the first through third barrier synchronizing control circuit 80—1 through 80—3 to the upper network device 50 located on the right hand of the upper network device 50, as shown in FIG. 12 via line ends (I—1) (i—3), each representing three lines.

Data is serially transferred from the first through third barrier synchronizing control circuits 80—1 through 80—3 to the network device 40 connected to the upper network device 50 via line ends (m—1) through (m—3).

Control signals are transferred from the first through third barrier synchronizing control circuit 80—1 through 80—3 to the network device 40 connected to the upper network device 50 via three data lines feeding each of line ends (n—1) through (n—3).

A description will now be given of the functions of the barrier synchronizing control circuit 80—1 of the upper network device 50. Each of the barrier synchronizing control circuits 80—2 and 80—3 has the same functions as the barrier synchronizing control circuit 80—1.

Registers 82 connected in series successively latch serial data applied via the line end (g—1). It is also possible to use a single register 82. Registers 83 connected in series successively latch the control signal applied via the line ends (h—1). Registers 84 connected in series successively latch serial data applied via the line end (j—1). Registers 85 connected in series successively latch the control signal applied via the line ends (j—1). A selector 86 selects either the output signal of the register 82 or the output signal of the register 84. A selector 87 selects either the output signal of the register 83 or the output signal of the register 85. A selector 88 selects either the output signal of the register 82 or the output signal of the register 84. A selector 89 selects either the output signal of the register 83 or the output signal of the register 85.

A register 90 latches the output signal of the selector 86. A check circuit 91 comprising an EOR circuit 91a, a register 91b and a check circuit 91c, performs a parity check operation on the serial data output from the register 90. A register 92 sequentially latches the serial data output from the register 90, and outputs the latched serial data to the line end (k—1). A controller 93 controls the check timing of the check circuit 91. A register 94 latches the control signal output from the selector 87, and outputs it to the line ends (1—1). A register 95 latches the output signal of the selector 88. A check circuit 96 comprising an EOR circuit 96a, a register 96b and a check circuit 96c, performs a parity check operation on the serial data output from the register 95. A register 97 sequentially latches the serial data output from the register 95, and outputs the latched serial data to the line end (m—1). A controller 98 controls the check timing of the check circuit 96. A register 99 latches the control signal output from the selector 89, and outputs it to the line ends (n—1).

In a normal operation mode, the selector 88 does not execute a selecting process in which the serial data applied via the line end (i—1) is directly output to the line end (m—1), and the selector 89 does not execute a selecting process in which the control signal applied via the line ends (j—1) is directly output to the line ends (n—1). The selectors 88 and 89 are specifically provided for use during a debugging process.

FIG. 13 shows the format of data serially transferred between the barrier synchronizing control circuits 60—i and the barrier synchronizing control circuits 80—i (that is, between the network device 40 and the upper network device 50), and data serially transferred between adjacent barrier synchronizing control circuits 80—i. Data serially transferred between two printed circuit boards contains an area #1 consisting of 10 bits respectively set to "1". It will be noted that the circuits 60—i and 80—i are mounted on respective printed circuit boards. Further, the data format has a 10-bit data area #2 containing data indicating that the data being transferred is data latched in the PE status register 61. Further, the data area #2 contains eight-bit identification (ID) information indicative of the network device 40 serving as the source of the latched data, a parity bit subsequent to the ID information, and a bit of zero following the parity bit. The data format contains eight 10-bit areas #3. Each of the 10-bit areas contains the program process completion information concerning the eight computers latched in the PE status register 61, a parity bit subsequent to the eight-bit information, and a bit of zero following the parity bit. The parity bit added to each eight-bit data is generated by the parity bit generating circuit 66, and the bit of zero subsequent to the parity bit ensures that the 10-bit data containing the bit of zero being considered consists of 10 bits of 1. Hereinafter, data having the data format shown in FIG. 13 serially transferred between the two printed circuit boards is referred to as barrier data.

The aforementioned control signals are transferred between the barrier synchronizing control circuits 60—i and the barrier synchronizing control circuit 80—i (that is, between the network device 40 and the upper network device 50), and are transferred between two adjacent upper network devices 50. More particularly, three different control signals are transferred in the embodiment of the present invention. The first control signal instructs the network device 40 to serve as a master device, to generate barrier data by using the data latched in the PE status register 61 and to transfer the barrier data. Hereinafter, the first control signal is referred to as a parent command. The second control signal is used to signal the transfer starting timing at which transfer of the barrier data is started. The third control signal is used to stop transferring the barrier data.

A description will now be given of the barrier synchronizing control executed in a preferred embodiment of the present invention. In order to facilitate understanding of the barrier synchronizing control, a first case will be described where only the barrier synchronizing control circuits 60—1 and 80—1 are provided, that is, only one of the three serial transmission lines 30 and one of the three serial transmission lines 31 are provided. Thereafter, the barrier synchronizing control in the case where the three circuits 60—i and the three circuits 80—i are provided will be described.

Process [1]

In accordance with the barrier synchronizing signal from the service processor, one of the network devices 40 is supplied with the parent command. In response to receipt of the parent command, the selectors 64 and 65 of the selected network device 40 sequentially read the data latched in the PE status register 61. Thereafter, the parity bit generating circuit 66 generates the parity bit for each of the pieces of the data read from the PE status register 61. The selector 68 executes the selecting process in which the parity bit and the bit of zero are placed at the appropriate positions. In this manner, the barrier data is generated. The register 69 transfers the barrier data from the line end (d—1) to the 64 computers 10 under control of the appropriate network device 40. The register 71 transfers the barrier data from the line end (e—1) to the upper network device 50 connected to the appropriate network device 40.

Process [2]

When the barrier data is transferred from the network device 40 having the parent command, the register 84 of the corresponding upper network device 50 receives the barrier data via the line end (i—1), and the selector 86 selects the received barrier data. The selected barrier data is transferred, via the registers 90 and 92, from the line end (k—1) to the appropriate upper network device located on the right side of the upper network device 50. At this time, the selector 87 provides the controller 93 with the control signal for the barrier data transfer starting timing from the network device 40 having the parent command received via the line end (i—1). In response to the above control signal, the check circuit 91 executes the parity check operation on the transferred barrier data.

Process [3]

When the barrier data is transferred from the appropriate upper network device 50 located on the left side of the upper network device 50, the register 82 of the appropriate upper network device 50 receives the barrier data via the line end (g—1), and the selector 86 selects the received barrier data. The selected barrier data is transferred from the line end (k—1) to the upper network device 50 located on the right side of the upper network device 50 being considered via the registers 90 and 92. The selector 88 selects the received barrier data, and transfers the selected barrier data from the line end (m—1) to the corresponding network device 40 via the registers 95 and 97. At this time, the selector 87 supplies the controller 93 with the control signal for barrier data transfer starting timing supplied from the upper network device 50 located on the left side via the line ends (h—1). In response to the above control signal, the check circuit 91 executes the parity check operation on the transferred barrier data. The selector 89 supplies the controller 98 with the control signal for barrier data transfer starting timing supplied, via the line ends (h—1), from the upper network device 50 located on the left side of the network device 50 being considered. In response to the control signal, the check circuit 96 executes the parity check operation on the barrier data.

Process [4]

The register 67 of the network device 40 receives the barrier data from the corresponding upper network device 50 via the line end (b—1). The selector 68 selects the received barrier data. The selected barrier data is transferred to the 64 computers 10 via the register 69 and the line end (d—1). At this time, the controller 63 supplies the check circuit 70 with the control signal for the barrier data transfer starting timing supplied from the upper network device 50 via the line ends (c—1). In response to the control signal, the check circuit 70 executes the parity check operation on the transferred barrier data.

All the upper network devices 50 other than the upper network device 50 connected to the network device 40 to which the parent command is supplied respectively execute the process [3], and the network devices connected to the respective upper network devices 50 execute process [4]. As shown in (A) of FIG. 14, the barrier data generated from the data latched in the PE status register 61 of the network device 40 (located on the left-side part of (A) of FIG. 14) to which the parent command is supplied is transferred to all the computers 10.

Process [5]

The controller 63 of the network device 40, to which the parent command is supplied from the service processor, generates the barrier data, and transfers it to the 64 computers 10 under control, and the upper network device 50 connected thereto. Then, the controller 63 transfers the parent command to the upper network device 50 via the register 73 and the line ends (f—1). The selector 87 of the upper network device 50 receives the parent command, and transfers the parent command received via the line ends (j—1) to the upper network device 50 located on the right side via the register 94 and the line ends (l—1). The selector 89 of the upper network device 50 receives the parent command via the line ends (h—1), and transfers it the network device 40 via the register 99 and the line ends (n—1). In accordance with transfer of the parent command, the parent command is held in the network device 40 adjacent to the right side of the network device 40 in which the parent command was held.

Figures 15, 16:
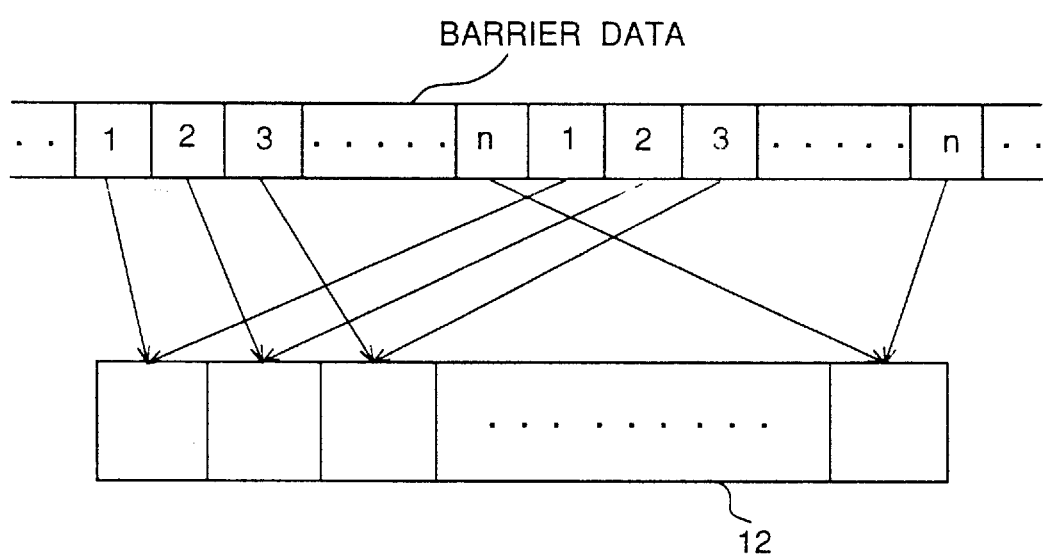
FIG. 15 is a block diagram showing the process of the present invention.
FIG. 16 is a block diagram showing the process of the present invention.

When the parent command has been transferred to and held in the network device 40 according to the process [5], the above-mentioned processes [1]–[4] are sequentially performed, and the process [5] is performed. By repeatedly executing the processes [1]–[5], the barrier data generated from the data latched in the PE status register 61 of the network device 40 in which the parent command is held is transferred to all the computers 10.

Where n network devices 40 are provided, a repetitive sequence of the consecutive pieces of barrier data shown in FIG. 15 is supplied to all the computers 10. The repetitive sequence starts from barrier data generated by the network device 40 of ID=1 and ends with barrier data generated by the network device 40 of ID=n.

Figure 6:
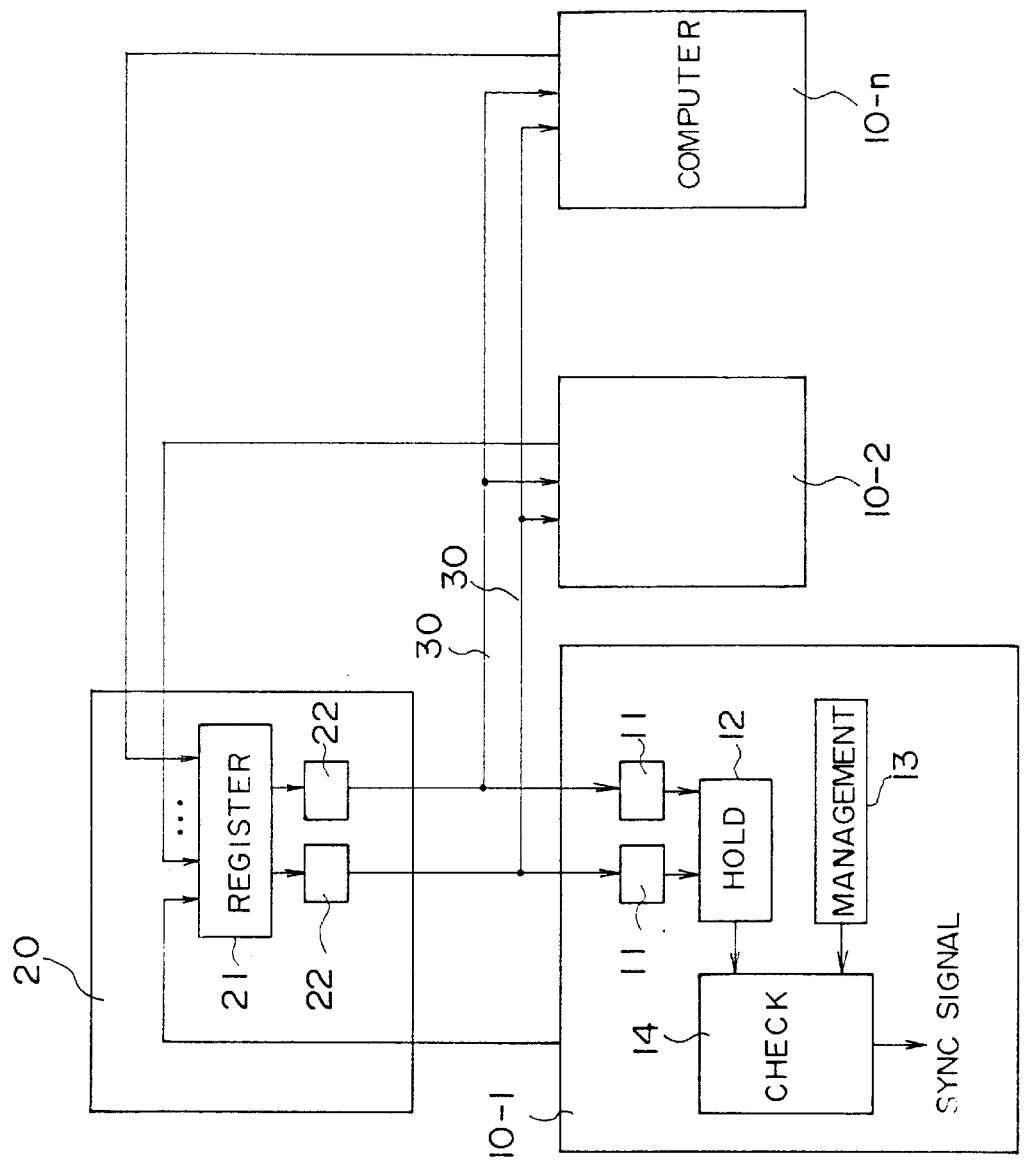
FIG. 6 is a block diagram of an overview of a first configuration of the present invention.

In response to transfer of the barrier data, as shown in FIG. 16, the receiving unit 11 of the computer 10, as shown in FIG. 6, (the case where only one serial transfer line 30 and only one serial transfer line 31 are used is being described) writes each of the pieces of the transferred barrier data into an area of the holding unit 12 specified by the ID information contained in the barrier data. The check unit 14, as shown in FIG. 6, refers to the contents of the holding unit 12, and determines whether or not all the computers 10 indicated as computers sharing the program have completed the shared program. When the check unit 14 has confirmed the completion of execution of the shared program, it generates the barrier synchronizing signal.

It can be seen from the above description that the barrier synchronizing signal is generated on the side of computers 10.

Figure 17:
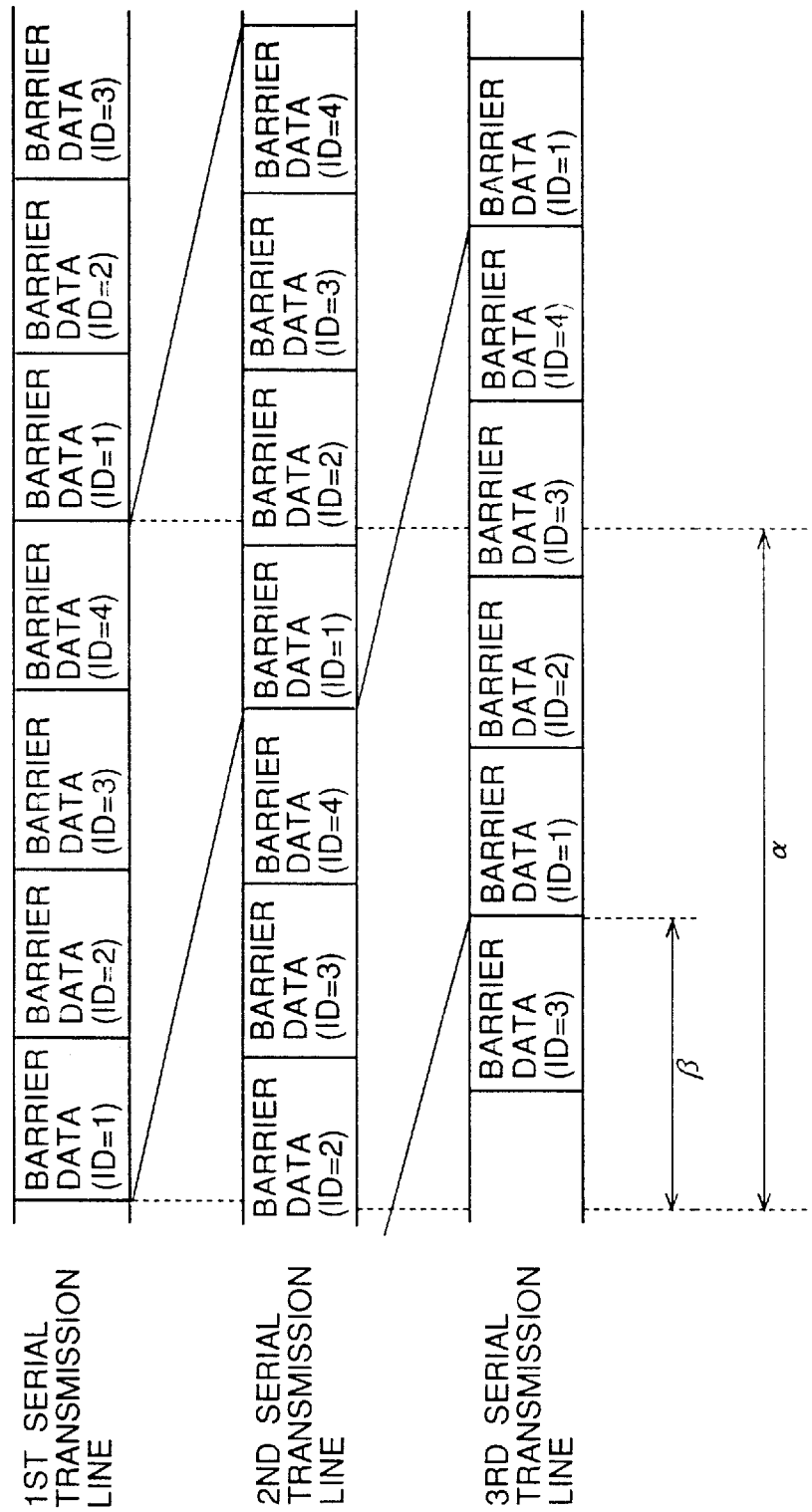
FIG. 17 is a block diagram showing the process of the present invention.

A description will now be given of the second case where the three barrier synchronizing control circuits 60—i and the three barrier synchronizing control circuits 80—i are used. The barrier synchronizing control circuits 60—1, 60—2 and 60—3 of the network unit 40 read the data latched in the PE status register 61 and transfer the read data at the respective transfer starting timings. For example, where four network devices 40 are used, as shown in FIG. 17, it is preferable that consecutive pieces of barrier data transferred via the first to third serial transmission lines are transferred so that the phase difference among the serial transmission lines is equal to $\frac{1}{3}$ the period of each piece of the repetitive sequence of barrier data. Hence, it takes a period of time a to transfer one repetitive sequence of barrier data (one period) to each computer 10 in the case where only one barrier synchronizing control circuit 60—1 is used, while it takes a period of time 1 to transfer one repetitive sequence of barrier data to each computer 10 in the case where three barrier synchronizing control circuits 60—1—60—3 are used. It can be seen from the above that the latter case is capable of transferring barrier data at speeds higher than in the former case.

Figure 18:
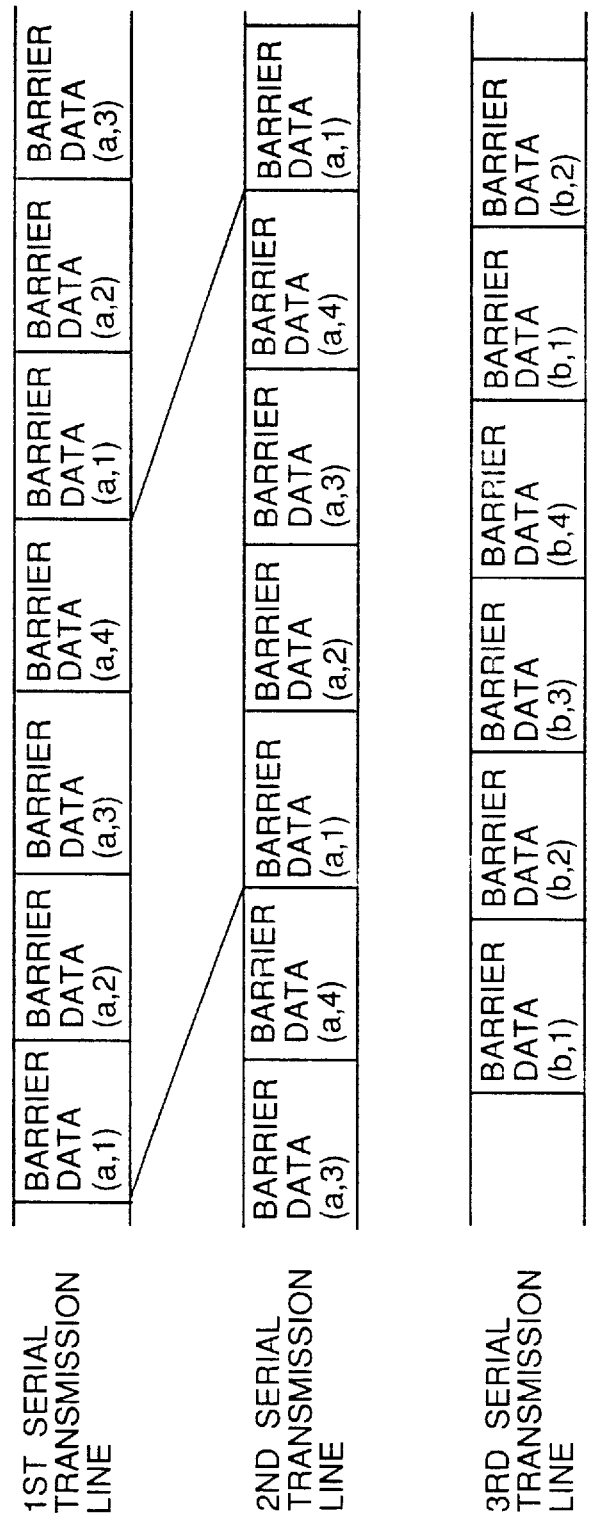
FIG. 18 is a block diagram showing the process of the present invention.

In a case where the computers 10 concurrently execute a plurality of tasks in a time sharing manner, a plurality of barrier synchronizing control circuits 60—i generates pieces of barrier data related to the tasks. For example, if there are two tasks 'a' and 'b' as shown in FIG. 18, pieces of barrier data related to the task 'a' are transferred via the first and second serial transmission lines, and pieces of barrier data related to the task 'b' are transferred via the third serial transmission line. In the case shown in FIG. 18, four barrier synchronizing control circuit 60—i are used.

Figure 19:
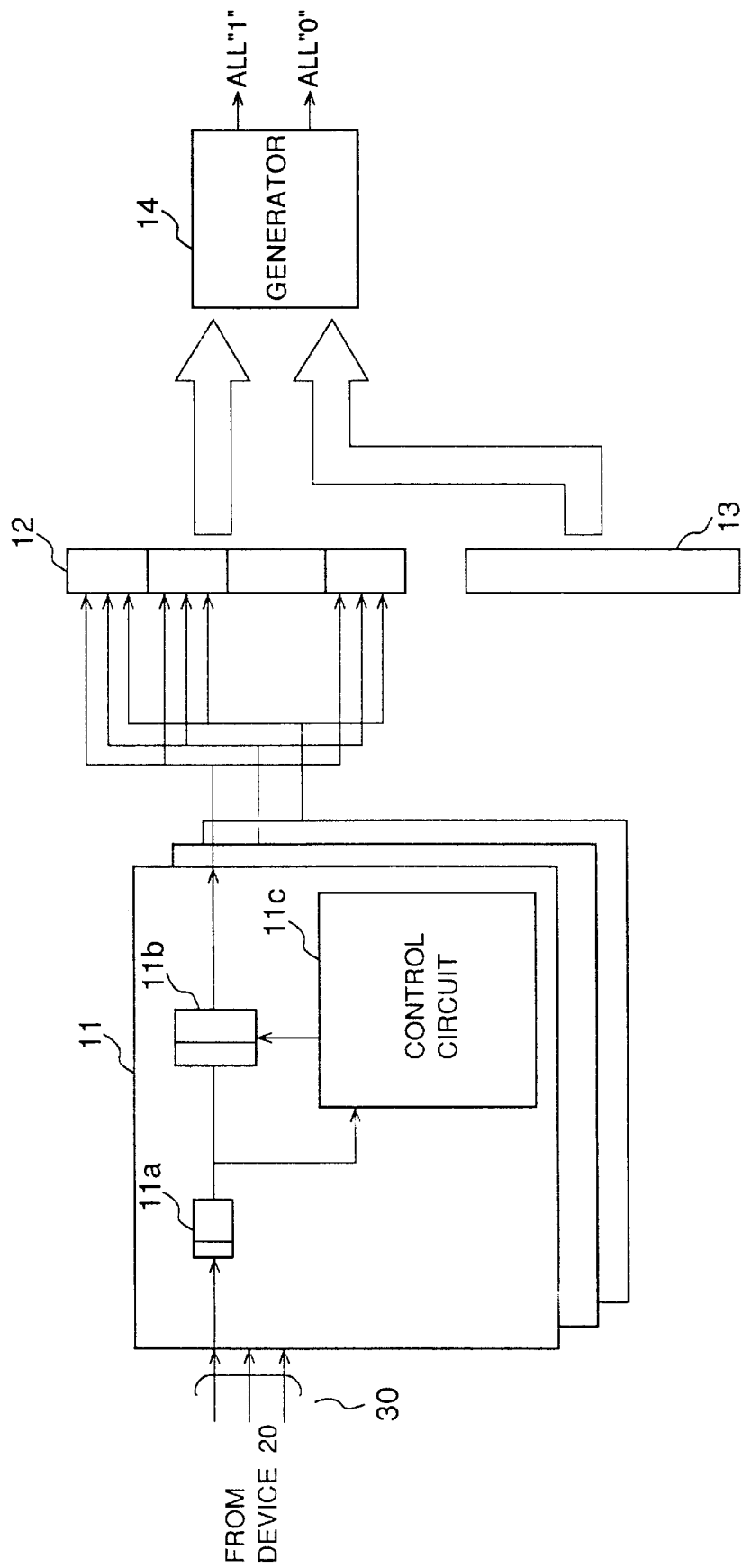
FIG. 19 is a block diagram showing the structure of a computer used in the embodiments of the present invention.

FIG. 19 is a block diagram showing the detail of the structure of each computer 10 shown in FIG. 6. Each of the receiving units 11 comprises a one-bit register 11a, a nine-bit (eight bits and one parity bit) register 11b and a control circuit 11c. The control circuit 11c detects the leading bit of the received serial data, and controls the bit position of the register 11b into which the serial data latched in the register 11a is written. When eight-bit data and a parity bit has become available in the register 11b, the contents of the holding unit 12 are partially updated so that the eight-bit data and the parity bit are substituted for the old data in the status register 12. The holding unit 12 is formed with a register having a number of bits equal to the number (n) of computers used in the entire system. Similarly, the management unit 13 is formed with a register having a number of bits equal to the number (n) of computers used in the entire system. The check unit 14 is formed with a synchronizing signal generating circuit. When the bits in the register 12 corresponding to bits of "1" registered in the register 13 are all "1", the circuit 14 generates an all-"1" signal. When the bits in the register 12 corresponding to bits of "1" registered in the register 13 are all "0", the circuit 14 generates an all-"0" signal. The all-"1" signal can be represented as follows:

$$(\overline{M0}-S0) \times (\overline{M1}+S1) \times \ldots \times (\overline{Mn}+Sn)$$

where Si (i=1, 2, ..., n) denotes each bit in the register 12, and Mi denotes each bit in the register 13. The all-"0" signal can be represented as follows:

$$(\overline{M0}+S0) \times (\overline{M1}+S1) \times \ldots \times (\overline{Mn}+Sn)$$

According to the present invention, the barrier synchronizing control signals can be generated by a simple hardware structure. Since the function of the mask register used in the prior art is shared by the computers, the adapter devices do not need a large amount of hardware. In addition, it is easy to cope with changes of the program groups.

The present invention is not limited to the specifically disclosed embodiments, and variations and modifications may be made without departing from the scope of the present invention.

What is claimed is:

1. A parallel data processing control system for a parallel computer system for performing data processing jobs, said parallel computer system having a plurality of computers which share the data processing jobs, and an adapter device connecting the computers to each other, said parallel data processing system comprising:

a plurality of serial transmission lines extending from the adapter device to each of the computers;

first means, provided in the adapter device, for serially transferring pieces of data processing progress state information, indicating how much of an assigned part of the data processing job a corresponding computer has finished, to each of the plurality of computers via said plurality of serial transmission lines at different transfer timings;

second means, provided in each of the computers, for holding the pieces of the data processing progress state information regarding each of the plurality of computers;

third means, provided in each of the computers, for holding management information indicating a group of computers which share a data processing job; and fourth means to establish barrier synchronization, provided in each of the computers, for determining whether each computer is part of a barrier synchronization based on the management information and whether the computers in the group have completed the data process based on the pieces of the data processing progress state information from each of the plurality of computer in the group.

2. The parallel data processing control system as claimed in claim 1, further comprising:

a plurality of adapter devices;

a plurality of first serial transmission lines provided between one of the adapter devices and one of the computers; and a plurality of second serial transmission lines provided between adjacent adapter devices, wherein the first means comprises means for serially outputting the pieces of the data processing progress state information to the plurality of first serial transmission lines and the plurality of second serial transmission lines at different transfer timings.

3. The parallel data processing control system as claimed in claim 1, wherein each of the pieces of the data processing progress state information contains identification information related to a corresponding one of the computers.

4. A parallel data processing control system for a parallel computer system for performing data processing jobs, said parallel computer system having a plurality of computers which share the data processing jobs, and a plurality of adapter devices, each of the computers being connected to one of the adapter devices, adjacent said adapter devices being connected to each other via serial data lines, said parallel data processing control system comprising:

a plurality of first serial transmission lines provided between one of the adapter devices and one of the computers;

first means, provided in each of the adapter devices, for serially transferring pieces of data processing progress state information, indicating how much of an assigned part of the data processing job each computer under control of a corresponding adapter device has finished, to each of the plurality of computers under control of the corresponding adapter device via the plurality of first serial transmission lines and to a first adjacent one of the adapter devices via the serial data lines at different transfer timings;

second means, provided in each of the adapter devices, for transferring pieces of data processing progress state information regarding each of the plurality of computers received via a second adjacent one of the adapter devices to the computers under control of the corresponding adapter device and the first adjacent one of the adapter devices;

third means, provided in each of the computers, for holding the pieces of the data processing progress state information supplied from the first means and the second means;

fourth means, provided in each of the computers, for holding management information indicating a group of computers which share a data processing job; and fifth means to establish barrier synchronization, provided in each of the computers, for determining whether each computer is part of a barrier synchronization based on the management information and whether the computers in the group have completed the data process on the basis of the pieces of the data processing progress state information from each of the plurality of computers in the group.

5. The parallel data processing control system as claimed in claim 4, further comprising:

a first serial transmission line provided between one of the adapter devices and one of the computers; and a second serial transmission line provided between two adjacent adapter devices, wherein the first means comprises means for serially outputting the pieces of the data processing progress state information to the first serial transmission line and the second serial transmission line.

* * * * *

UNITED STATES PATENT AND TRADEMARK OFFICE
CERTIFICATE OF CORRECTION

PATENT NO. : 5,832,261
DATED : November 3, 1998
INVENTOR(S) : Kenichi ISHIZAKA et al.

It is certified that error appears in the above-identified patent and that said Letters Patent is hereby corrected as shown below:

Col. 7,
    line 56, after "11" insert --,--;
    line 67, change "(3-3)" to --(d-3)--.

Col. 8,    line 7, before "to" insert --60-3--;

Col. 9,    line 14, delete "," (second occurrence);
    line 20, after "12" insert --,--.

Col. 13,    line 16, change "a" (second occurrence) to --$\alpha$--;
    line 20, change "1" to --$\beta$--.

Signed and Sealed this

Twenty-second Day of August, 2000

Attest:

Q. TODD DICKINSON

*Attesting Officer*    *Director of Patents and Trademarks*